United States Patent [19]

Samuelsson et al.

[11] Patent Number: 5,675,408
[45] Date of Patent: Oct. 7, 1997

[54] DEVICE AND METHOD FOR THE MEASURING OF WHEEL ANGLES

[76] Inventors: Jonas Samuelsson, Rusthallaregatan 7, 702 20 Orebro; Amin Nassif Issa, Altsarbyn 115, 795 90 Rättvik, both of Sweden

[21] Appl. No.: 375,898

[22] Filed: Jan. 20, 1995

[30] Foreign Application Priority Data

Jan. 21, 1994 [SE] Sweden ............... 9400173

[51] Int. Cl.$^6$ ............................. G01B 11/26
[52] U.S. Cl. ................................. 356/155
[58] Field of Search ................ 356/154, 155, 356/152.1, 152.2, 152.3, 153, 39.04; 250/559.3, 559.37; 33/288, 203–203.21; 364/424.04

[56] References Cited

U.S. PATENT DOCUMENTS

| | | |
|---|---|---|
| 2,292,968 | 8/1942 | Peters . |
| 3,100,846 | 8/1963 | Burkhardt . |
| 3,369,444 | 2/1968 | Patrignani . |
| 3,865,492 | 2/1975 | Butler ............... 356/155 |
| 4,135,086 | 1/1979 | Baba . |
| 4,336,658 | 6/1982 | January et al. . |
| 4,416,065 | 11/1983 | Hunter ............... 33/203.15 |
| 4,490,608 | 12/1984 | Yeadon et al. ............... 250/235 |
| 4,898,464 | 2/1990 | Thorne et al. . |
| 5,335,420 | 8/1994 | Kling, III et al. ............... 33/288 |

FOREIGN PATENT DOCUMENTS

| | | |
|---|---|---|
| 2158660 | 6/1973 | France . |
| 951945 | 3/1964 | United Kingdom . |
| 9219932 | 11/1992 | WIPO . |
| 9219931 | 11/1992 | WIPO . |

*Primary Examiner*—K. Hantis
*Attorney, Agent, or Firm*—Hayes, Soloway, Hennessey, Grossman & Hage, P.C.

[57] ABSTRACT

A method and apparatus for measuring the alignment of vehicle wheels includes a light source having two beams projecting on opposite directions. The source is mounted on the wheel approximately perpendicular to the wheel axis. Measuring scales are mounted along the paths of the beams in front of and behind the wheels. When taking measurements, the wheel is rotated 180° after a first measurement and a second reading of the scales is made. The difference between the two sets of readings is used to determine the deviation of the light beam from the perpendicular to the wheel axis and this deviation is compensated for in measuring the wheel alignment. Optical sighting means such as a camera can be used in place of the two beam light source.

21 Claims, 4 Drawing Sheets

DEVICE AND METHOD FOR THE MEASURING OF WHEEL ANGLES

BACKGROUND OF THE INVENTION

This invention is related to a device, a set up and a method for the measuring of wheel angles at vehicles for the checking and adjustment thereof.

Since already comparatively small angular deviations in particular for the toe-in angle can result in reduced road holding as well as an increased wear on tires and bearings and an increased fuel consumption the correct adjustment of the wheels, and in particular the steering ones is important in production as well as in service maintenance of road going vehicles. At lorries and trucks in particular a faulty adjustment can result in great costs since the tires are expensive and comparatively stiff and therefor unable to compensate larger angular maladjustments.

In view of the need to measure wheel angles a number of devices are known. These include in the more precise devices the fastening of pivotable or rotatable transmitter means or sighting devices on wheels that are to be checked. Since the wheels however can be skew these transmitters or sighting devices must always be adjusted on the wheel so that an exact correspondence is achieved for the rotational axis of the wheel and the axis of the transmitter or at least so that these are exactly parallel. This is a time consuming procedure that also requires a certain amount of skill of the user. Furthermore even a very small play in the device leads to erroneous measurements. The transmitters frequently for instance include a light source for instance a laser that is rotatable around an axle. A small play in the corresponding bearing result in faulty measurements and as a result the demands on the precision of the bearing will be great as will the costs.

In view of the circumstantial handling and the risk of faults and the price of known devices there exist a need for a device for wheel measuring, in particular for the measuring of the toe-in angle that is easier to handle, low priced and preferably more exact than those on the market today.

SUMMARY OF THE INVENTION

This object is in accordance with the invention achieved with a wheel measuring device that includes light beam projection means or sighting means, possibly in the shape of video cameras, that unyieldingly and unturnably are mounted on the wheels. The light beam projection means include a light source or light sources that can emit light beams in two opposite directions. If instead a sighting device is used this is made so that it can be sighted with in two opposed directions. Further the invention makes use of measuring scales on which the light beams project or on which readings are taken by means of sighting devices. The sighting devices may consist of video cameras either two mounted together and with opposing viewing directions or a single camera that is made to look in two directions by means of mirrors. By using different filters for the different directions the different reading may be recognized. Modern picture processing technique can actually be employed to electronically obtain a reading of the scales. Alternatively position or location indicators can be used providing the camera with fixed points the lateral positions of which relative the center plane of the camera can be obtained by electronic picture processing. This means that the location indicators can be very simple means, for instance a frame painted on the floor. Light emitting diodes recessed into the floor or mounted on specific points on the vehicle for this latter case no filters are necessary since the diodes may have different colors recognizable by the camera or rather the electronic processing connected to it or them.

Since the general principle for the use of sighting devices is the same as for the use of light beam projection means or sources only the latter is below described in greater detail.

Another object of the invention is to provide a measuring method that will allow quick measuring with high precision even in untrained hands. This is in accordance with the invention achieved by using the invented device described above in the manner set forth below.

The light source in the invented device transmitting light in two diametrically opposite directions eliminates the need of adjustment of the light sources in relation to the wheels. The reason for this is that if the wheel is skew or for some other reason the emitted beams are not exactly perpendicular to the rotation axis of the wheel this will result in the opposed beams giving different readings on the scale or scales as the wheel is rotated, but the actual toe-in angle of the wheel corresponds to the middle value of the two readings, that is a point precisely between the two readings on each scale. These points precisely in the middle between the readings on each scale correspond to the readings that would have been obtained if the lasers had been adjusted to be precisely perpendicular to the wheel axis, however the exactness will be improved with the invention and the measurement will be obtained quicker.

By arranging for instance three scales for each side of a vehicle the precise rotational plane of the wheel is measured or obtained and toe-in and camber angles can be calculated, for instance by a suitable preprogrammed computer.

The most important angle is the toe-in and it is also the angle that most easily is upset. This angle can be measured with only two scales on each side of the vehicle if these are on the same horizontal level, since in this way the plane of the measuring scales will be parallel to the plane in which the toe-in angle lies.

According to the invented method the wheels are rotated on their own axles in order to obtain the two readings. This can be done by jacking up the vehicle enabling the wheels to rotate freely, this is however less desirable since the wheel angles then often change. In accordance with a further development of the invention it is therefor suggested that the wheels are so arranged that they can be rotated while still supporting the vehicle, this can for instance be achieved by placing them on rollers or endless bands supported on rollers or other means.

An other alternative is to mount the scales on the vehicle itself and then move the vehicle on its own wheels so that these rotate over the necessary half turn. This embodiment is in particular possible for the measuring of the toe-in, while the above embodiment enables not only checking of correct toe-in but also a very quick and exact adjustment of the wheel angles since the measuring can continue during the adjusting of the wheel angles, which is normally impossible at the previously known devices.

In a simple but useful further development of the invention the laser device is provided with an additional lockable angular adjustment means between the light beam source and its wheel mounting bracket in such a way that the light beams can be angled relative the rotational plane of the wheel. The light beam source is further provided with a spirit level so arranged that its zero or adjusted position gives the light beam and its source a vertical direction.

By positioning the light source vertically and then locking the adjustment means the light source will have an angle relative the rotational plane of the wheel that is the same as the camber angle of the wheel. The wheel is then turned over a quarter of a turn or a right angle so that the light beams are projected on a front and rear scale giving first readings or scale values. If the wheel is turned forwards, the scales get a second readings. The difference between the two readings are related to the camber of the wheel. For each scale the camber angle will move one reading to the right and one to the left so that the distance between the readings correspond to the double camber angle. The true camber in millimeter per meter can therefor be calculated as the difference between the front scale readings plus the difference between the rear scale readings divided by the double distance in meter between the scales. This also means that the exact location of the wheel is unimportant for the exact calculation of the camber angle. Since this camber angle in millimeters per meter actually is the tangent of the camber angle the camber angle in degrees can be obtained through the arctanfunction.

The toe in angle can be measured or rather be evaluated simultaneously with the above camber evaluation by taking the readings on the scales given by rotating the wheel over three quarters of a turn. As in the previously described methods the toe-in is given by the mean or middle value between the readings on each scale.

If a wheel is skew this is of no importance and will not influence the measuring. Since the accuracy of a spirit level adjustment is great also the measuring of the camber angle will be very exact. Since adjustment and spirit level means can be obtained at low cost the price for obtaining the camber angle is less than if one would have to use additional scales instead.

In particular for the case where video cameras are used the cameras can instead of scales use a framing for instance painted on the floor or ground together with the contour of the vehicle or simple additional sighting means fastened to the vehicle as a base for the calculations. Still however it is the sighting in two directions that renders adjustment of the sighting device on the wheel unnecessary (unless the camber angle is to be measured by means of a spirit level)

Further developments of the invention are apparent from the subclaims and the embodiments described below in connection with the drawings. In the drawings FIG. 1 depicts the measuring of front wheel angles in a first embodiment, FIG. 2 front wheel measuring in a second embodiment, FIG. 3 the measuring of the angles at rear wheels and FIG. 4 schematically a measuring of the camber angle with only two scales.

BRIEF DESCRIPTION OF THE DRAWINGS

FIG. 2 is a schematic form of the invention for measuring toe in.

FIGS. 4A, 4B, and 4C are diagrammatic schematic drawings showing means for employing a spirit level for measuring camber and toe in.

DETAILED DESCRIPTION OF THE INVENTION

Figure 1:
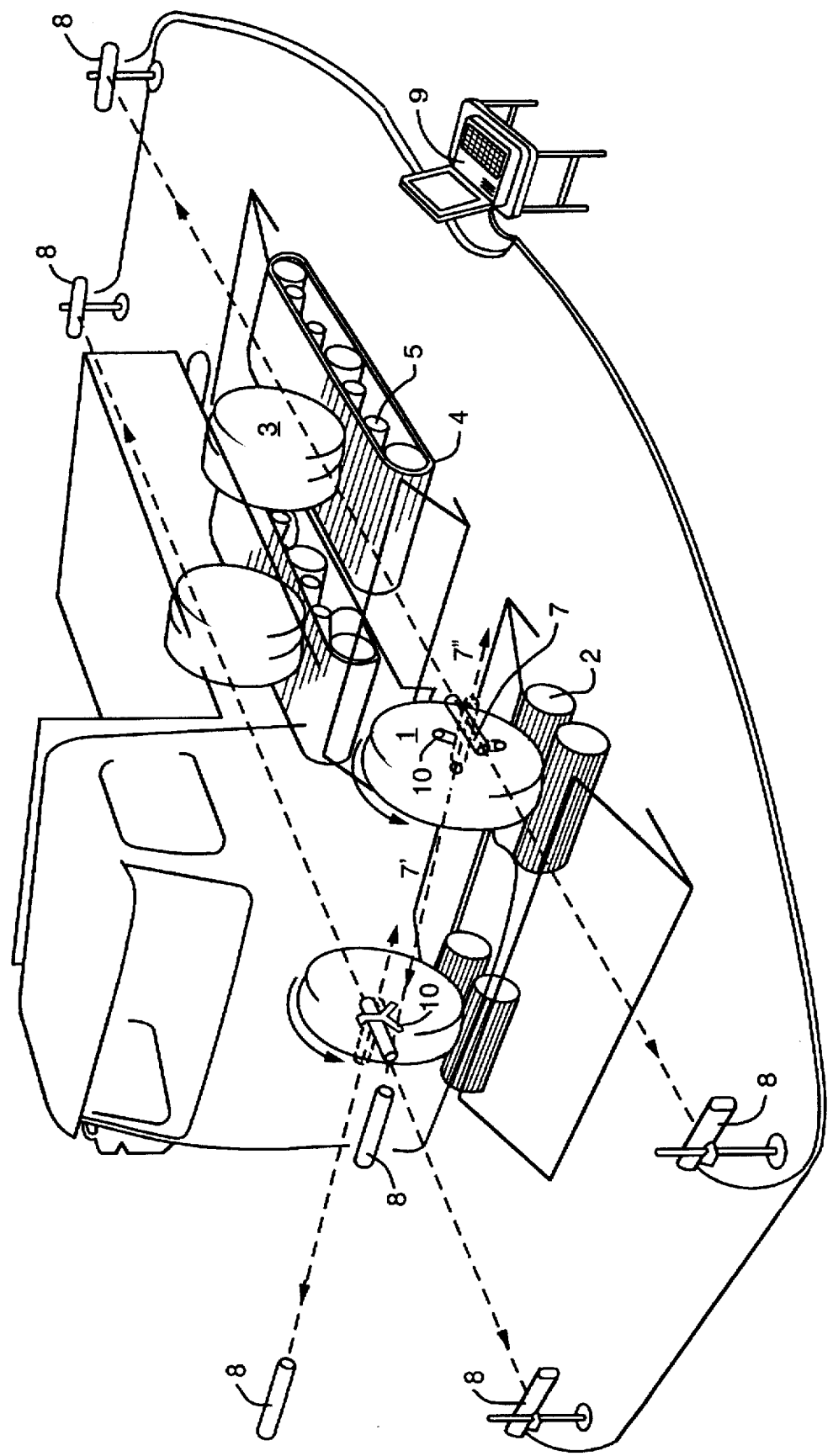
FIG. 1 is a diagrammatic perspective view of a vehicle employing the invention for measuring both toe in and camber.

In FIG. 1 is shown how a vehicle is placed with the front wheels 1 on rollers 2 and the rear wheels 3 on a roller track 4 that in turn is supported on a number of rollers or cylinders 5. This enables the measuring of vehicles with differing wheelbases. The roller device depicted for the front wheels 1 can for instance be one that is also used for the testing of brakes. This in turn means that with a very moderate extra work or cost toe-in and camber can be measured every time that the brakes are checked.

In front of and behind the vehicle and approximately in level with the wheel axles scales 8 are arranged, and an additional scale 8 is arranged a distance above those in front of the vehicle The location of and the distance between the scales can be measured electronically by integrated means or they can be arranged in a fixed relationship to the rollers 2 below the front wheels, for instance on precipitable beams or recessed into the floor and possible to drive over or they may even be mounted on the vehicle itself.

On the wheels that are to be subjected to the measuring laser devices 7 are arranged. These laser devices include fastening means 10 for fastening on the wheel in question essentially centered in relation to these. The laser devices also include a laser that emits two beams 7', 7" directed in exactly opposite directions. Instead of lasers other light sources or sighting devices as for instance video cameras can be used but due to the construction of the laser no extra problems are encountered in order to achieve two exactly opposed beams, since a laser always give two opposed beams due to its working principle. The laser devices can be driven by batteries making any connections for these unnecessary. The scales that are preferably electronic are connected to a computer unit for the calculation of the readings on the scales and the transforming of these to angle values.

In FIG. 1 for the measuring and adjusting the laser devices 7 are mounted on the front wheels that are then rotated causing the laser beams to project on the scales. For each scale two readings are obtained, one for each beam direction. (In case of the laser being exactly perpendicular to the rotational axis of the wheel the projection points or dots on the scales will coincide). For each scale the computer then calculates the mean position exactly between the projection points of the laser and which mean position corresponds to a direction exactly perpendicular to the wheel axis. In the computer is already stored the distances between the scales and their relation in space relative each other and the rollers for the wheels and thus the wheel axis. Based on this information and the readings on the scales the computer calculates the toe-in and camber angles of the vehicle wheel.

Figure 2:
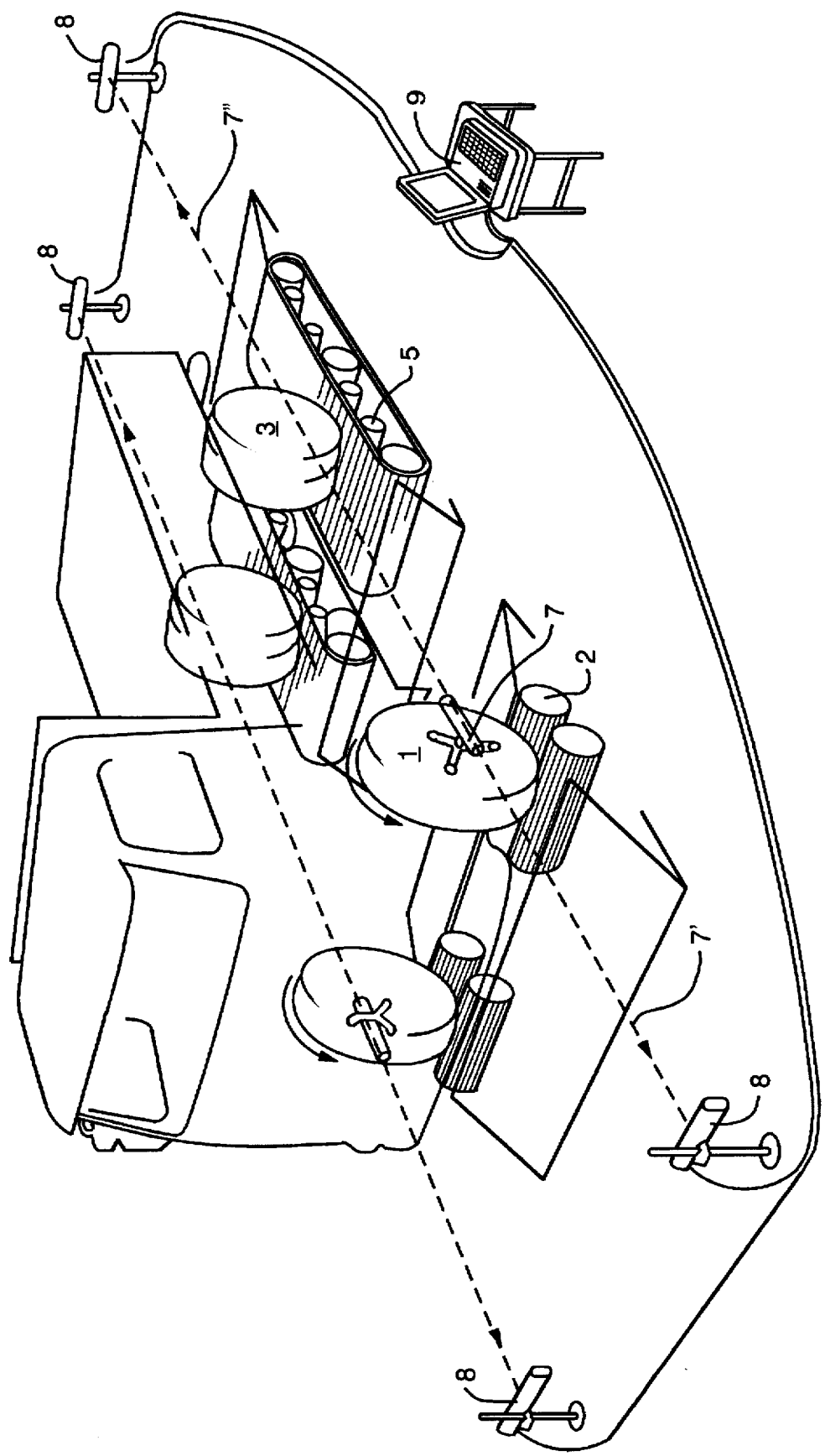

In FIG. 2 the two upper front scales of FIG. 1 have been omitted. By arranging the front and rear scales of the same height over the imaginative plane on which the vehicle stands the scales will define a plane parallel with the above plane and the readings on the scales will correspond to the toe-in angle.

Figure 3:
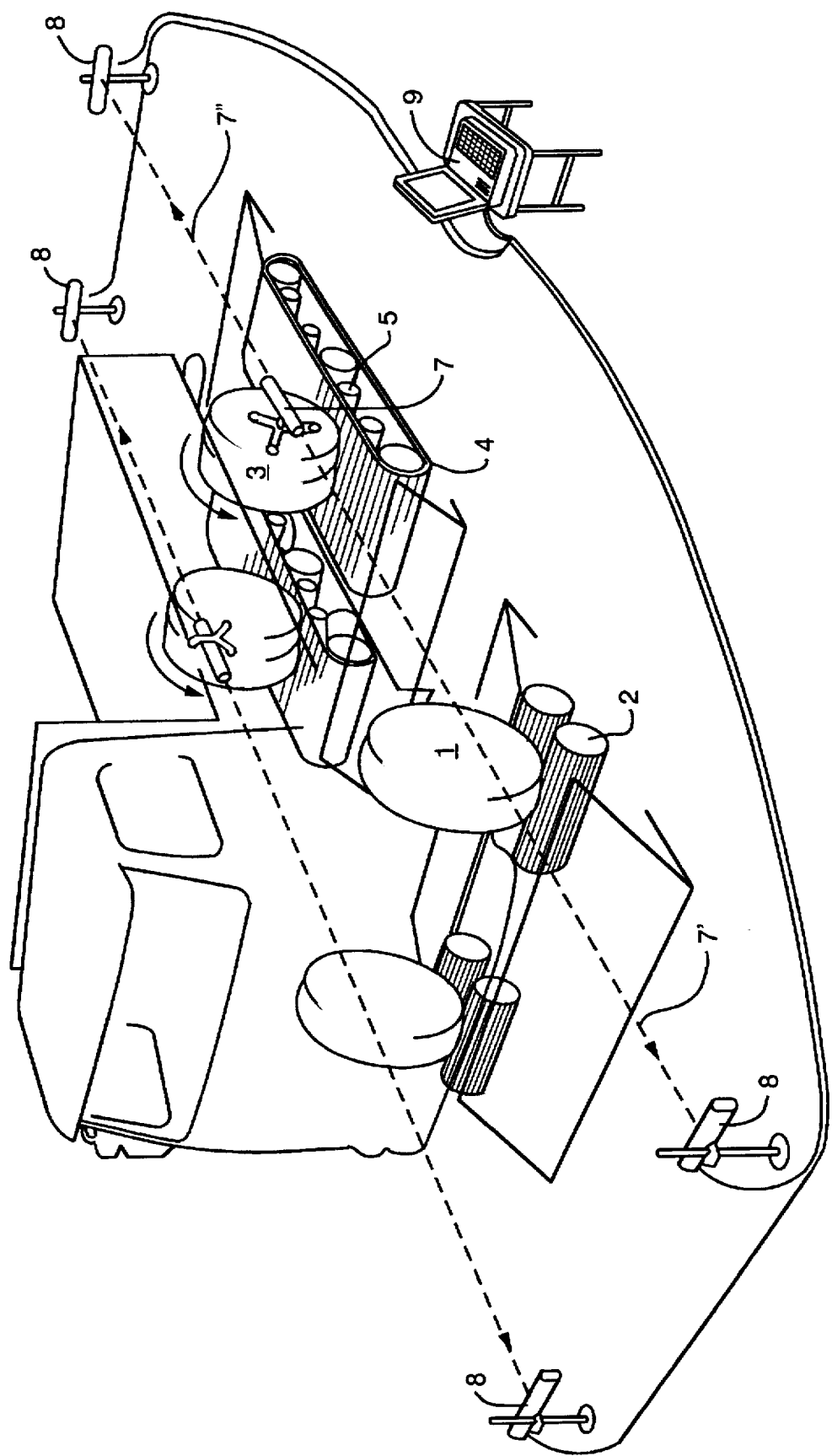
FIG. 3 is a schematic diagrammatic use of the invention for measuring toe in of the rear wheels.

In FIG. 3 is shown the measuring of the toe-in angle of the rear wheels in the same way as for the front wheels shown in FIG. 2. By measurements on the front wheels as well as the rear wheels the relationship between the front and rear wheels can be checked and possible faults adjusted. These measurements can also be related to the length axis of the vehicle, to provide an exact symmetry and thereby a precise straight forward rolling of the vehicle.

Since all the parts of the measurement equipment can be mounted in or on the vehicle it is also possible to conduct the measurements in accordance with the invention anywhere and even with different conditions, for instance on grades or laterally inclined surfaces, with different loads etc in order really to measure the relevant angle or angles at the use of the vehicle and not as in other known devices with for instance the vehicle jacked up. Possible play in steering components can thus also be compensated.

Since the toe-in angle within a comparatively wide steering angle is the same, (that is, has its minimum) it is practically uninfluenced by the position of the steering wheel provided that there is no steering movement while a set of readings is taken. Even the possible effects of steering wheel influence can be minimized by mounting the lasers on the left and right side essentially in parallel so that readings are obtained at each scale at approximately the same time. When the measuring takes place on rollers the computer may control the rotation of these so that exact simultaneousness exists between the right and left side and thereby eliminating errors resulting from possible steering wheel movements during the measuring.

Since the laser devices on the wheels do not have to comprise sophisticated devices for centering and adjusting a rotational axis of the device exactly in parallel to the actual wheel axis these can be made far more simple and more sturdy than at the known technique and at lower cost. Also the scales and their fastening can be comparatively simple.

Figure 4A:
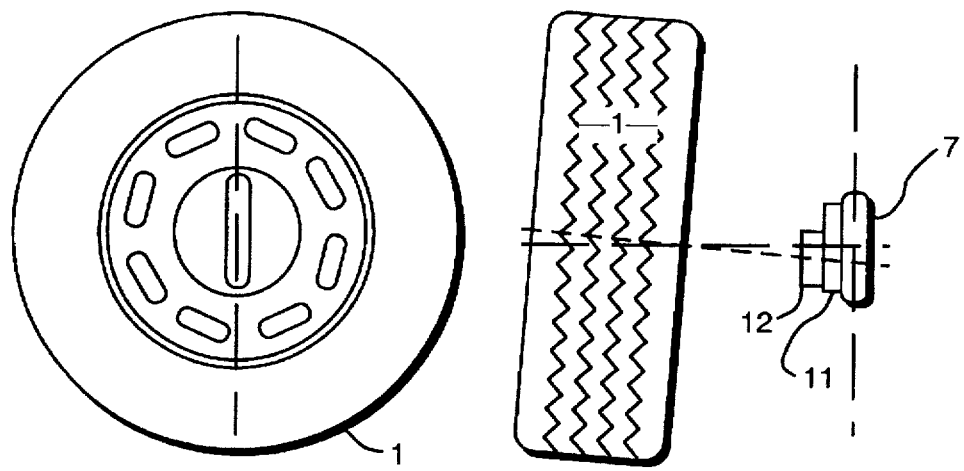
Figure 4B:
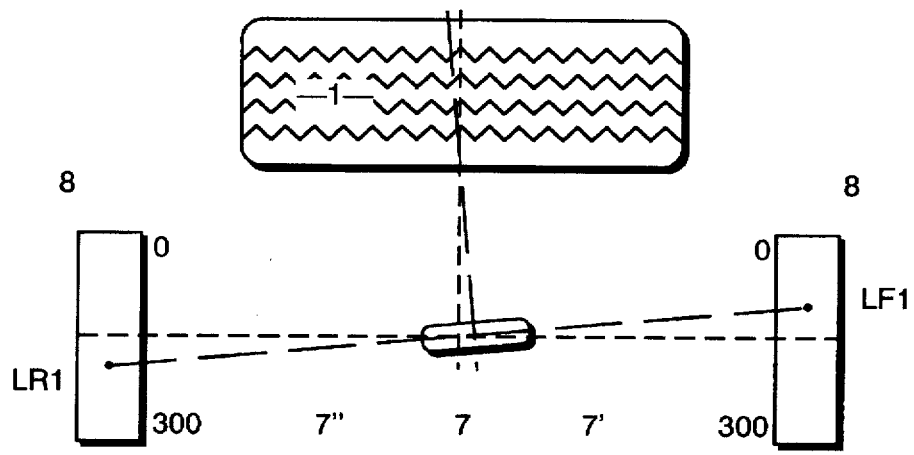
Figure 4C:
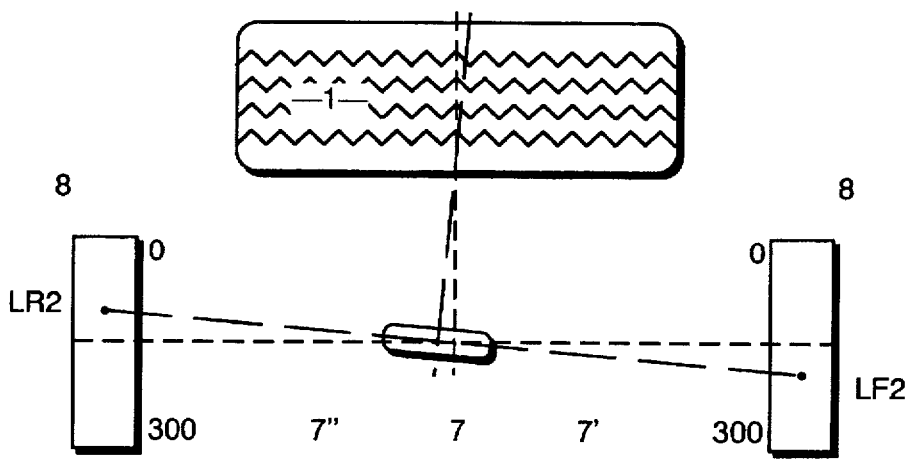

In FIG. 4 the laser device is provided with a spirit level 11 and an adjustment means 12 allowing tilting of the laser axially relative the wheel so that the laser may be adjusted to a vertical direction. The spirit level can be of the type that indicates in two directions or only in one direction. In the latter case this direction is of course the one perpendicular to the wheel. When this vertical adjustment (corresponding to FIG. 4a) is achieved the laser is locked in the adjustment means and the wheel is then rotated to the positions shown in FIG. 4b and 4c resulting in two readings on the front and two on the rear scales. The scale values or readings are fed to the computer that evaluates the angles according to the following mathematical expressions.

For the left wheel:

Toe in=[(LF1+LF2)/2−(LR1+LR2)/2]/D (mm/m)

Camber angle=[(LF1−LF2)/2−(LR1−LR2)/2]/D (mm/m)

where: LF1 is the reading in millimeters on the front left scale in a first position for the laser;

LR1 is the reading in millimeters on the rear left scale in the first position of the laser;

LF2 is the reading in millimeters on the front left scale in a second position for the laser;

LR2 is the reading in millimeters on the rear left scale in the second position of the laser;

D is the distance in meters between the scales in the length direction of the vehicle.

For the right side the same calculations are applicable. With toe in is generally meant the sum of the left and right wheel toe in, which figure is obtained by adding the toe in figures for the left and right side.

Rear wheel angles are obtained in the same way and if a rear axle is out of alignment this is easily discovered by the above toe in measuring that will give the same reading on both sides but with different signs. In other words toe in on one side and two out on the other side, unless the axle has become bent which also will be revealed in this way.

It should be noted that the invention allows the arranging of the scales in many different ways.

What I claim is:

1. A method for the measuring and adjustment of a wheel on a vehicle comprising the steps of placing the vehicle on rollers, mounting on the wheel light beam projection means emitting light beams in opposite directions and approximately perpendicular to the axis of rotation of the wheel, placing cooperating scales at different locations lengthwise of the vehicle and in the projection paths of the light beams, activating the light beam projection means and rotating the wheel on the rollers so that the opposing beams each give a reading on the corresponding cooperating scales, and using the collective readings on said scales to calculate the toe in or toe out wheel angle after compensating for deviation of the light beam from the perpendicular to the axis of rotation of the wheel.

2. A method according to claim 1 wherein the toe-in is calculated by using a middle reading between two projection points on each scale.

3. A method according to claim 1 wherein the light beam projecting means after mounting on a said wheel by an adjustment means is adjusted to a vertical direction of the opposed light beams, this adjustment is locked and the wheel is rotated so that the opposed beams alternating project on the corresponding cooperating scales, one being a front scale and one being a rear scale and that the wheel angle are calculated by means of the readings on the scales.

4. A method according to claim 3 wherein the toe-in is calculated by using a middle reading between two projection points on each scale and that the camber angle is calculated as the sum of the distances between the readings on each scale divided by the double distance between the scales.

5. A set up for measuring wheel angle of a wheel on a vehicle and including a light beam projection means and scales, wherein the light beam projecting means emit light beams in two opposed directions and have mounting means so that they can be mounted fixed on a wheel with the light beams approximately perpendicular to the axis of rotation of the wheel, means for rotation of the wheel 180°, at least two scales being provided at different locations lengthwise of the vehicle in front of the vehicle and behind the vehicle for the light beams to be projected to produce a double set of readings of differences between front and back readings at a first wheel position and at a second wheel position after 180° rotation of the wheel, using the readings from said two positions to determine the degree of deviation of the light beams from normality to the axis of rotation of the wheel, and using this deviation to correct toe in or toe out wheel angle after compensating for deviation of the light beam from the perpendicular to the axis of rotation of the wheel.

6. A set up according to claim 5 including rolls or bands on which the wheel of the vehicle can rotate.

7. A set up according to claim 5, wherein said two scales are mounted in the front and one in the rear of the vehicle on the same height over the ground so that the toe-in angle can be obtained directly.

8. A set up according to claim 5, including three scales on each side of the vehicle to enable also the measuring of the camber angle.

9. A set up according to claim 5, wherein the scales are electronic.

10. A set up according to claim 5, wherein the light beam projection means is a laser.

11. A set up according to claim 5 wherein an adjustment means is arranged on a fastening bracket of the light beam projection means allowing an angleing or inclination of the light beam projection means and the light beams relative the wheel and a spirit level on the light beam projection means indicating a position with the beams vertically, in which position the adjusted angle can be locked thereby corresponding to the camber angle.

12. A set up for measuring wheel angle of a wheel on a vehicle and including a sighting means and scales, wherein the sighting means have sighting paths in two opposed directions and have mounting means so that they can be mounted fixed on a wheel with the sighting paths approximately perpendicular to the axis of rotation of the wheel, means for permitting rotation of the wheel 180°, at least two scales being provided at different locations lengthwise of the vehicle in front of and behind the vehicle for the sighting paths to produce a double set of readings of differences between front and back readings at a first wheel position and at a second wheel position after 180° rotation of the wheel, using the reading from said two positions to determine the degree of deviation of the sighting paths from normality to the axis of rotation of the wheel, and using this deviation to calculate the toe in or toe out wheel angle after compensating for deviation of the sighting paths from the perpendicular to the axis of rotation of the wheel.

13. A set up according to claim 12 including rolls or bands on which the wheel of the vehicle can rotate.

14. A set up according to claim 12, wherein said at least two scales being two sighting indicators, a front one and a rear one are mounted on the same height over the ground so that the toe-in angle can be obtained directly.

15. A set up according to claim 12, including three sighting indicators on each side of the vehicle to enable also the measuring of the camber angle.

16. A set up according to claim 12, wherein the sighting means is a camera.

17. A set up according to claim 12, wherein an adjustment means is arranged on a fastening bracket of the sighting means allowing an angleing or inclination of the sighting means and its sighting paths relative the wheel and a spirit level on the sighting means indicating a position with the sighting paths vertically, in which position the adjusted angle can be locked.

18. A method for the measuring and adjustment of a wheel on a vehicle comprising the steps of placing the vehicle on rollers, mounting on a wheel sighting means with sight paths in opposite directions and approximately perpendicular to the axis of the rotation of the wheel, placing scales at different locations lengthwise of the vehicle and in the sighting paths of the sighting means, rotating the wheel on the rollers so that the opposing sighting paths each give a reading on every cooperating scale, and using the readings on these scales to calculate wheel toe in or toe out angle after compensating for deviation of the sighting paths from the perpendicular to the axis of rotation of the wheel.

19. A method according to claim 18, wherein the toe-in is calculated by using a middle measure between two measurements obtained on each scale by the different sighting directions.

20. A method according to claim 18 wherein the sighting means after mounting on a wheel by an adjustment means is adjusted to a vertical direction of the opposed paths, this adjustment is locked and the wheel is rotated so that the opposed paths alternatingly bear on front and rear location indicators and that the wheel angle are calculated by means of the measurements obtained.

21. A method according to claim 18 wherein the toe-in is calculated by using a middle measurement between two measurements relative each scale and that the camber angle is calculated from the distance between the two measurements obtained for each scale.

* * * * *

UNITED STATES PATENT AND TRADEMARK OFFICE
CERTIFICATE OF CORRECTION

PATENT NO. : 5,675,408
DATED : OCTOBER 7, 1997
INVENTOR(S) : SAMUELSSON ET AL

It is certified that error appears in the above-identified patent and that said Letters Patent is hereby corrected as shown below:

Claim 3, Col. 6, Line 15, after "on" delete --a--.

Signed and Sealed this

Eleventh Day of August 1998

Attest:

BRUCE LEHMAN

*Attesting Officer*  *Commissioner of Patents and Trademarks*